United States Patent
Park et al.

(10) Patent No.: US 10,503,027 B2
(45) Date of Patent: Dec. 10, 2019

(54) CURVED DISPLAY PANEL, MANUFACTURING METHOD THEREOF AND CURVED DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Jungho Park, Beijing (KR); Fangzhuan Liu, Beijing (CN); Ting Ye, Beijing (CN); Jingyong Hu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/952,286

(22) Filed: Apr. 13, 2018

(65) Prior Publication Data

US 2019/0064572 A1   Feb. 28, 2019

(30) Foreign Application Priority Data

Aug. 31, 2017   (CN) .......................... 2017 1 0775071

(51) Int. Cl.
*G02F 1/1339* (2006.01)
*G02F 1/1333* (2006.01)
*G02F 1/1335* (2006.01)

(52) U.S. Cl.
CPC .... *G02F 1/13394* (2013.01); *G02F 1/133305* (2013.01); *G02F 1/133371* (2013.01);
(Continued)

(58) Field of Classification Search
CPC ............... G02F 1/13394; G02F 1/1339; G02F 1/133512; G02F 1/133345; G02F 1/1333;
(Continued)

(56) References Cited

U.S. PATENT DOCUMENTS

2016/0231607 A1\* 8/2016 Wu ................... G02F 1/1339
2018/0173034 A1\* 6/2018 Yonemura ........... G02F 1/13394

FOREIGN PATENT DOCUMENTS

CN          103955096 A         7/2014
CN          104049399 A         9/2014
(Continued)

OTHER PUBLICATIONS

First Office Action for Chinese Patent Application No. 201710775071.2 dated Aug. 15, 2019.

*Primary Examiner* — Thoiq V Duong
(74) *Attorney, Agent, or Firm* — Calfee, Halter & Griswold LLP

(57) ABSTRACT

A curved display panel includes a first substrate and a second substrate that are opposite to each other, a liquid crystal layer disposed in a gap between the first substrate and the second substrate, wherein the first substrate is provided with spacers for supporting the first substrate and the second substrate to form the gap, and arrangement densities of the spacers are gradually reduced from the center of the curved display panel to either side of non-curved edges of the curved display panel.

15 Claims, 4 Drawing Sheets

(52) U.S. Cl.
CPC .................. *G02F 1/133512* (2013.01); *G02F 2001/13396* (2013.01)

(58) Field of Classification Search
CPC ......... G02F 1/133305; G02F 1/133371; G02F 2001/13396
See application file for complete search history.

(56) References Cited

FOREIGN PATENT DOCUMENTS

| | | |
|---|---|---|
| CN | 105116633 A | 12/2015 |
| CN | 105467692 A | 4/2016 |
| CN | 105759513 A | 7/2016 |
| JP | 2009115933 A | 5/2009 |

\* cited by examiner providing a black matrix frame at the outer periphery of the liquid crystal layer, at least along the two sides of the bending direction of the display panel and between the first substrate and the second substrate —S301

CURVED DISPLAY PANEL, MANUFACTURING METHOD THEREOF AND CURVED DISPLAY DEVICE

CROSS REFERENCE TO RELATED APPLICATIONS

This application claims the benefit of Chinese Patent Application No. 201710775071.2, entitled "CURVED DISPLAY PANEL, MANUFACTURING METHOD THEREOF AND CURVED DISPLAY DEVICE", and filed on Aug. 31, 2017, the entire contents thereof are incorporated herein by reference.

TECHNICAL FIELD

The present disclosure relates to the field of display technology, and in particular, to a curved display panel, a manufacturing method thereof and a curved display device.

BACKGROUND

The liquid crystal display panel includes an array substrate, a opposite substrate, and a liquid crystal layer and a photo spacer (PS) disposed between the array substrate and the opposite substrate. The spacer mainly plays a supporting role to support the gap between the array substrate and the opposite substrate, so as to prevent the liquid crystal molecules from receiving excessive pressure between the array substrate and the opposite substrate.

With the maturation of liquid crystal display technology, the screens can be properly bent to adapt to the curvature of ergonomics, and a curved display panel, which can make the distance between human eyes and each point on the screen closer to obtain a better visual effect, has become a further development trend of the display panel. Especially when applied to a large-size display, the curved display panel can provide a wider view field and enable the user to obtain more intense on-site effect and sensory experiences.

However, in the process of bending the display panel with an appropriate curvature to form a curved display panel, bending of the display panel generally applies a squeezing force to the display panel along two lateral sides in the operation state of the display panel, and the center area of the entire display panel is subject to the pressing from either side of the display panel to the center, such that the pressing force on the center area is larger than the pressing force at the position at either side. After the bending operation of the display panel is completed, corresponding bending deformation may occur on either side of the display panel which no pressing force is applied (i.e. curved edges of the curved display panel), while no bending deformation occurs on either side of the display panel which pressing force is applied (i.e. non-curved edges of the curved display panel). Since the center area of the display panel is subjected to a large bending and pressing force, such that the gap between the first substrate and the second substrate disposed oppositely is smaller at the position of the central area, and is larger at the position in the peripheral area, especially at the positions at the two sides where the pressing force is applied. In this way, when the backlight is displayed at the position passing through the peripheral area, the difference in the optical path of the light will increase, and the displayed color temperature will change, such that the color displayed on the screen at the position of the peripheral area is yellowish, especially at the positions of either sides where the pressing force is applied, thereby affecting the screen display effect of the curved display panel.

It should be noted that the information disclosed in the foregoing background section is only for enhancement of understanding of the background of the disclosure and therefore may include information that does not constitute prior art that is already known to those of ordinary skill in the art.

SUMMARY

In one aspect of the embodiments of the present disclosure, there is provided a curved display panel including: a first substrate and a second substrate that are opposite to each other, and a liquid crystal layer disposed in a gap between the first substrate and the second substrate, wherein the first substrate is provided with spacers for supporting the first substrate and the second substrate to form the gap, and arrangement densities of the spacers are gradually reduced from the center of the curved display panel to either side of non-curved edges of the curved display panel.

In an exemplary embodiment, a ratio of the arrangement density of the spacers at a central position of the curved display panel to the arrangement density of the spacers at either side of the non-curved edges of the curved display panel is greater than 1 and equal to or less than 3.

In an exemplary embodiment, the curved display panel further includes a plurality of pillow pads distributed on the side of the second substrate close to the liquid crystal layer, with one end of the spacer close to the second substrate abutting against the pillow pad; wherein from the center of the curved display panel to either side of the non-curved edges, heights of the surfaces of the plurality of pillow pads abutting against the spacers gradually increase.

In an exemplary embodiment, the pillow pad is disposed corresponding to the spacer, the pillow pad is a disc shape structure depressed in the center, and the surface abutting against the spacer is the center of the disc shape structure.

In an exemplary embodiment, the pillow pad is a metal pillow pad.

In an exemplary embodiment, between the first substrate and the second substrate, a black matrix frame is disposed on the outer periphery of the liquid crystal layer, at least along the two sides of the non-curved edges of the curved display panel.

In an exemplary embodiment, the black matrix frame is disposed on each side of the outer periphery of the liquid crystal layer, and black matrix frames at adjacent sides are connected end to end.

In another aspect of the embodiments of the present disclosure, there is provided a curved display device including the curved display panel of any of the above.

In yet another aspect of the embodiments of the present disclosure, there is provided a method for manufacturing a curved display panel, including: forming a display panel, the display panel including a first substrate and a second substrate that are opposite to each other, and a liquid crystal layer disposed in a gap between the first substrate and the second substrate, wherein the first substrate is provided with spacers for supporting the first substrate and the second substrate to form the gap, and arrangement densities of the spacers are gradually reduced from the center of the curved display panel to either side of non-curved edges of the curved display panel; and bending and fixing the display panel to form the curved display panel.

In an exemplary embodiment, forming the display panel includes: providing a plurality of pillow pads on the side of the second substrate close to the liquid crystal layer, wherein heights of the surfaces of the plurality of pillow pads abutting against the spacers gradually increase from the center of the display panel to either side of the non-curved edges.

In an exemplary embodiment, forming the display panel includes: between the first substrate and the second substrate, providing a black matrix frame at the outer periphery of the liquid crystal layer, at least along the two sides of the non-curved edges of the display panel.

BRIEF DESCRIPTION OF THE DRAWINGS

In order to more clearly describe the technical solutions in the embodiments of the disclosure or in the prior art, the drawings used in the description of the embodiments or the related art will be briefly described below. Apparently, the drawings in the following description are only some embodiments of the present disclosure, those skilled in the art can also obtain other drawings based on these drawings without any creative effort.

DETAILED DESCRIPTION

The following clearly describes the technical solutions in the embodiments of the present disclosure with reference to the accompanying drawings in the embodiments of the present disclosure. It is apparent that the described embodiments are merely a part of the embodiments of the present disclosure, but not all of the embodiments. All other embodiments obtained by a person of ordinary skill in the art based on the embodiments of the present disclosure without creative efforts shall fall within the protection scope of the present disclosure.

Figure 1:
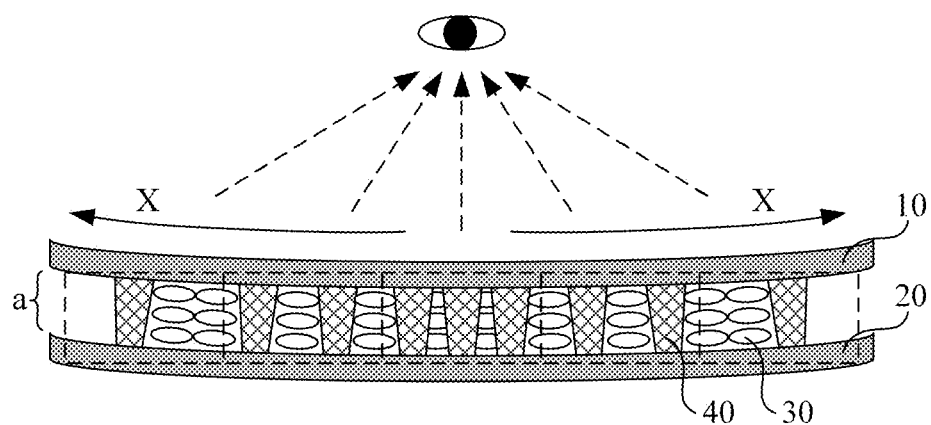
FIG. 1 is a schematic structural diagram of a curved display panel provided by an embodiment of the present disclosure.

An embodiment of the present disclosure provides a curved display panel. As shown in FIG. 1, the curved display panel includes a first substrate 10 and a second substrate 20 that are opposite to each other, a liquid crystal layer 30 disposed in a gap a between the first substrate 10 and the second substrate 20. The first substrate 10 is provided with spacers 40 for supporting the first substrate 10 and the second substrate 20 to form the gap a. The arrangement densities of the spacers 40 are gradually reduced from the center of the curved display panel to either side of the non-curved edges.

It should be noted that, firstly, as shown in FIG. 1, the first substrate 10 and the second substrate 20 are disposed oppositely, wherein the first substrate 10 and the second substrate 20 may be an array substrate and a color filter substrate disposed opposite to each other. Alternatively, for a display panel in which a black matrix and a color filter are disposed on a color filter on array (COA), the first substrate 10 and the second substrate 20 may also be an array substrate and a package substrate (or an opposite substrate).

Secondly, the spacers 40 disposed on the first substrate 1 abut against the second substrate 20 when the first substrate 10 and the second substrate 20 are aligned with each other, to form the gap a between the first substrate 10 and the second substrate 20. The gap a is sealed between the first substrate 10 and the second substrate 20 by a frame sealant (not shown in FIG. 1), thereby forming a space for accommodating the liquid crystal layer 30. The space may also be referred to as a liquid crystal box.

Thirdly, as shown in FIG. 1, when the curved display panel of the embodiment of the present disclosure is in a display state, for example, when a user views a curved television screen, in order to make the distance between the human eyes and the central position of the curved display panel and the distance between the human eyes and either side of the curved display panel are relatively approximate to each other, either side of the flat display panel are bent in the horizontal direction toward the direction of the human eyes. Compared to the flat display panel, in the curved panel display, when being bent, the distance between the human eyes and either side of the curved display panel is approximate to the distance between the human eyes and the central position of the curved display panel. The two sides in the horizontal direction are still linear after being bent, which are the non-curved edges of the curved display panel. The side visible from FIG. 1 and the opposite side of this side are bent to be deformed during the bending process of the curved display panel, which are the curved edges of the curved display panel. In the following, for ease of illustration and description, the curved surface bending direction X as shown by the arrow in FIG. 1 is the direction of the non-curved edges of the curved display panel, and other drawings and descriptions are the same.

Fourthly, as shown in FIG. 1, in the same unit area shown by each of a plurality of dashed-line boxes, the arrangement densities of the spacer 40 gradually decrease from the center to either end. Wherein, the unit area represented by the dashed-line box is an exemplary quantified representation of the changing trend of the arrangement densities of the spacers 40, and the embodiment of the present disclosure is not limited thereto.

Fifthly, in the related art, the purpose of the spacers 40 provided in the liquid crystal display panel is generally to support the space between the first substrate 10 and the second substrate 20, thereby controlling the thickness of the liquid crystal layer 30. The spacers 40 may be disposed in two manners. One manner is forming granular spacers 40, which are sprayed on the surface of the alignment film after the alignment film is printed and aligned. Since the spacers 40 are granular, and are not connected to the substrate 10 or the second substrate 20, the positions of the spacers 40 may shift within a certain range. The other manner is making the spacers 40 having one end disposed on the first substrate 10, such that the positions of the spacers 40 are not changeable. For example, the patterns of the spacers 40 may be directly formed on the first substrate 10 through a patterning process. The spacers 40 made in this manner are usually of columnar shapes, such as the spacers 40 of the trapezoidal structure in the embodiment of the present disclosure, wherein the bottom surface of the trapezoidal structure is fixedly disposed on the first substrate 10, and the top surface of the trapezoidal structure abuts against the second substrate to achieve the function of supporting the space between the first substrate 10 and the second substrate 20. The spacers 40 in the embodiment of the present disclosure are manufactured by using the second manner.

An embodiment of the present disclosure provides a curved display panel, a manufacturing method thereof, and a curved display device. The curved display panel includes a first substrate and a second substrate that are opposite to each other, a liquid crystal layer disposed in a gap between the first substrate and the second substrate. The first substrate is provided with spacers for supporting the first substrate and the second substrate to form the gap. The arrangement densities of the spacers are gradually reduced from the center of the curved display panel to either side of the non-curved edges. By adjusting the arrangement densities of the spacer disposed on the first substrate in the curved display panel at the various positions, such that the arrangement densities of the spacers on the curved display panel are gradually reduced from the center of the curved display panel to either side of the non-curved edges, and the spacer at the center area of the curved display panel which subject to a larger pressing pressure in the bending process of curved display panel has a larger arrangement density, to balance the compression ratios of the spacers at various positions on the curved display panel. Thereby, under the support the spacers, it can improve the uniformity of the pressure received by the liquid crystal molecules at various positions in the liquid crystal layer. It can solve the problem that when the display panel is bent to form a curved display panel, liquid crystal molecules in the liquid crystal layer, located on the peripheral area of the panel, particularly at the position of either side of the non-curved edges, are disordered due to excessive pressure, and cause the part of the displayed screen of the curved display panel to be yellowish. It can improve the display effect of the curved display panel.

In an exemplary embodiment, a ratio of the arrangement density of the spacers 40 at a central position of the curved display panel to the arrangement density of the spacers 40 at either side of the non-curved edges of the curved display panel is greater than 1 and equal to or less than 3.

For example, as shown in FIG. 1, three spacers 40 are provided in a unit area at the central position, and one spacer 40 is disposed in a unit area at either side of the non-curved edges. That is, a ratio of the arrangement density at the central position to the arrangement density at either side of the non-curved edges is equal to 3. In this way, by adjusting the arrangement density of the spacers 40 at the central position and at either side of the non-curved edges, the compression ratios of the spacers 40 at the positions on the curved display panel can be balanced. It can improve the uniformity of the pressure received by the liquid crystal molecules at various positions in the liquid crystal layer 30.

If the ratio of the arrangement density of the spacers 40 at the central position to the arrangement density at either side of the non-curved edges is equal to 1, it means that the arrangement densities of the spacers 40 at the various positions are equal, and the arrangement densities of the spacers 40 are equal at the various positions on the curved display panel. Then, it cannot solve the problem that larger pressing force at the central area during the process of bending the curved display panel by disposing more spacers 40 at the central area. Since the difference between the pressing pressure at the central area and the pressing pressure at either side of the non-curved edges during the process of bending the curved display panel will change depending on the size of the curved display panel and the bending degree of the curved display panel, but will be in a fixed range, if the ratio of the arrangement density of the spacers 40 at the central position to the arrangement density at either side of the non-curved edges is greater than 3, it may be no desirable for balancing and adjusting the compression ratios of the spacers at various positions on the curved display panel due to the excessively large density of the spacers 40 at the central position.

Figure 2:
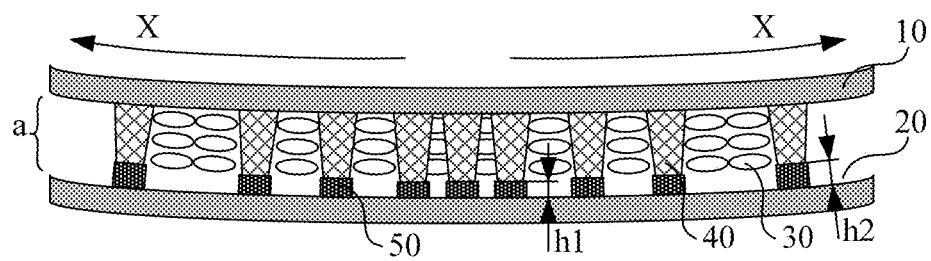
FIG. 2 is a schematic structural diagram of a curved display panel further including a pillow pad according to an embodiment of the present disclosure.

Further, as shown in FIG. 2, the curved display panel of the embodiment of the present disclosure further includes a plurality of pillow pads 50 distributed on the side of the second substrate 20 close to the liquid crystal layer 30, and one end of the spacer 40 close to the second substrate 20 abuts against the pillow pad 50. From the center of the curved display panel to either side of the non-curved edges, from the center of the curved display panel to either end, the heights of the surfaces of the plurality of pillow pads 50 abutting against the spacers 40 gradually increase.

It should be noted that, firstly, in the embodiment of the present disclosure, the height of the surface of the pillow pad 50 abutting against the spacer 40 refers to the distance from the portion where the surface of the pillow pad 50 abutting against the spacer 40 to the surface of the pillow pad 50 on the second substrate 20, that is, the thickness of the portion of the pillow pad 50 abutting against the spacer 40.

Secondly, in the embodiment of the present disclosure, one end of the spacer 40 is fixedly disposed on the first substrate 10, as shown in FIG. 2. When the curved display panel according to the embodiment of the present disclosure performs a bending operation in the curved surface bending direction X, with the deformation of the curved edge of the first substrate 10, the free end of the spacer 40 disposed on the first substrate 10 also moves along with it, slides into the pillow pad 50 disposed on the second substrate 20, and abuts against the surface of the pillow pad 50.

As shown in FIG. 2, the height h1 of the surface of the pillow pad 50 abutting against the spacer 40 at the central position of the curved display panel is relatively small, and the pressure subjected by the spacer 40 abutting against the pillow pad 50 at the central position of the curved display panel is relatively small. The height h2 of the surface of the pillow pad 50 abutting against the spacer 40 at either side of the curved display panel is relatively large, and the pressure subjected by the spacer 40 abutting against the pillow pad 50 at either side of the curved surface bending direction X of the curved display panel is relatively large. In this way, the difference by which the compression ratio of the spacers 40 at the central area larger than the compression ratio of the spacers 40 at the edge area during the bending process of the curved display panel can be partially cancelled. It can further improve the uniformity of the pressure received by the liquid crystal molecules at various positions in the liquid crystal layer 30.

Figure 3:
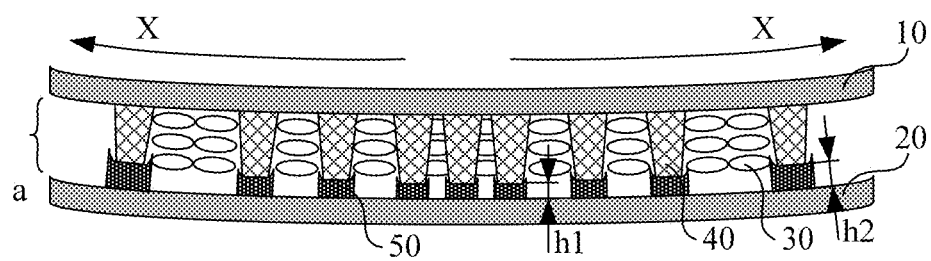
FIG. 3 is a schematic structural diagram of a curved surface display panel further including a pillow pad and the pillow pad being a disc shape depressed in the center according to an embodiment of the present disclosure.

In an exemplary embodiment, as shown in FIG. 3, the pillow pad 50 is disposed corresponding to the spacer 40, and the pillow pad 50 is a disc shape structure depressed in the center, and the surface abutting against the spacer 40 is the center of the disc shape structure.

In this way, as shown in FIG. 3, each spacer 40 correspondingly abuts against one pillow pad 50, such that the pillow pad 50 can further adjust the compression ratio of each spacer 40. In addition, the pillow pad 50 is a disc shape structure depressed in the center, and the spacer 40 abuts at the center of the disc shape structure, such that the spacer 40 is not easily slipped out of the abutting position. It can further improve the stability of the spacer 40 abutting against the pillow pad 50.

In an exemplary embodiment, the pillow pad 50 is a metal pillow.

As shown in FIG. 3, the pillow pad 50 in the embodiment of the present disclosure may be a non-metal material such as a silicon nitride material or a metal material. In one aspect, since the pillow pad 50 needs to be provided at a certain height on the second substrate 20, when the non-metallic material is used to process the pillow pad 50, it is difficult to set the pillow pad 50 to a large height due to the limitation of the nature of the material itself. On the other hand, using the metal material to form the pillow pad 50 on the second substrate 20 can form a pattern of the pillow pad 50 while making other metal layers on the second substrate 20. For example, the pattern of the pillow pad 50 may be formed by a half tone process simultaneously when forming a layer of metal film pattern closest to the pillow pad 50. In this way, it is not necessary to separately provide a process step for forming the pillow pad 50. Therefore, in an exemplary embodiment, the pillow pad 50 is made of a metal material on the second substrate 20.

Figure 4:
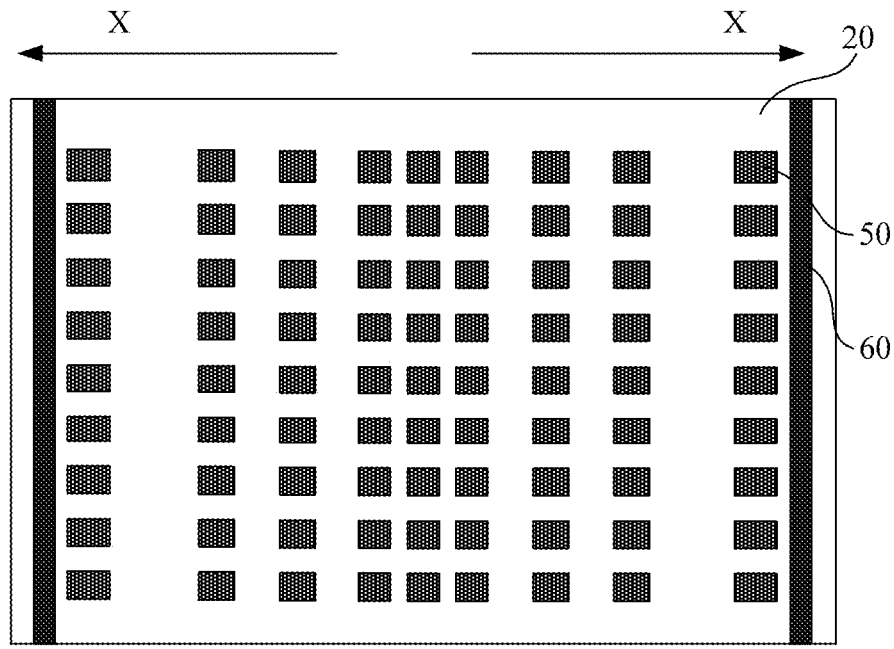
FIG. 4 is a first top view of FIG. 3 (without showing the first substrate, the spacer, and the liquid crystal layer)

Further, as shown in FIG. 4, between the first substrate 10 and the second substrate 20, a black matrix frame 60 is disposed on the outer periphery of the liquid crystal layer 30, at least along the two sides of the non-curved edges of the curved display panel.

As shown in FIG. 4, FIG. 4 is a top view of FIG. 3, in which for clarity of illustration, the first substrate 10, the spacers 40 disposed on the first substrate 10, and liquid crystal layer 30 between the first substrate 10 and the second substrates 20 are not shown. In the bending operation of the curved display panel of the embodiment of the present disclosure along the curved surface bending direction X, the first substrate 10 and the second substrate 20 are subjected to the bending operation force, and the non-curved edges are deformed to a certain degree, and the curved edges are moved in positions. In the liquid crystal layer 30, at the edge positions of the first substrate 10 and the second substrate 20, particularly the liquid crystal molecules at the positions of the two sides of the curved edges of the first substrate 10 and the second substrate 20 are subject to large forces and are easily to be disordered. As a result, the optical path difference of the liquid crystal molecules is inconsistent, which may cause the problem of light leakage in the dark state at the edge of the curved display panel. Based on this, as shown in FIG. 4, when the black matrix frame 60 is disposed on both sides of the non-curved side of the curved display panel, light leakage from the dark state on both sides of the non-curved edge of the curved display panel can be effectively reduced. It can improve the display effect of the curved display panel.

It should be noted that, firstly, in order to prevent the liquid crystal layer 30 from being exposed through the gap between the first substrate 10 and the second substrate 20, a frame sealant (not shown) is generally provided between the first substrate 10 and the second substrate 20. In order to avoid the influence of the black matrix on the display of the liquid crystal molecules, the black matrix frame 60 of the embodiment of the present disclosure is disposed between the first substrate 10 and the second substrate 20 and is located outside the frame sealant.

Secondly, in the embodiment of the present disclosure, the shape of the black matrix frame 60 is not be specifically limited and may be a straight bar shape as shown in FIG. 4 or a curved shape, etc., as long as the edge position between the first substrate 10 and the second substrate 20 may be blocked. In addition, the width of the black matrix frame 60 can be set by the person skilled in the art according to the actual design and application needs, which is not specifically limited in this embodiment of the disclosure.

Thirdly, the black matrix frame 60 of the embodiment of the present disclosure is disposed at least on the outer periphery of the liquid crystal layer 30, at least along the two sides of the curved surface bending direction X of the curved display panel. That is, the black matrix frame 60 may be disposed only on the outer periphery of the liquid crystal layer 30 at least along the two sides of the curved surface bending direction X of the curved display panel, or may be disposed also on the other two sides in addition to be disposed on the outer periphery of the liquid crystal layer 30 at least along the two sides of the curved surface bending direction X of the curved display panel.

Figure 5:
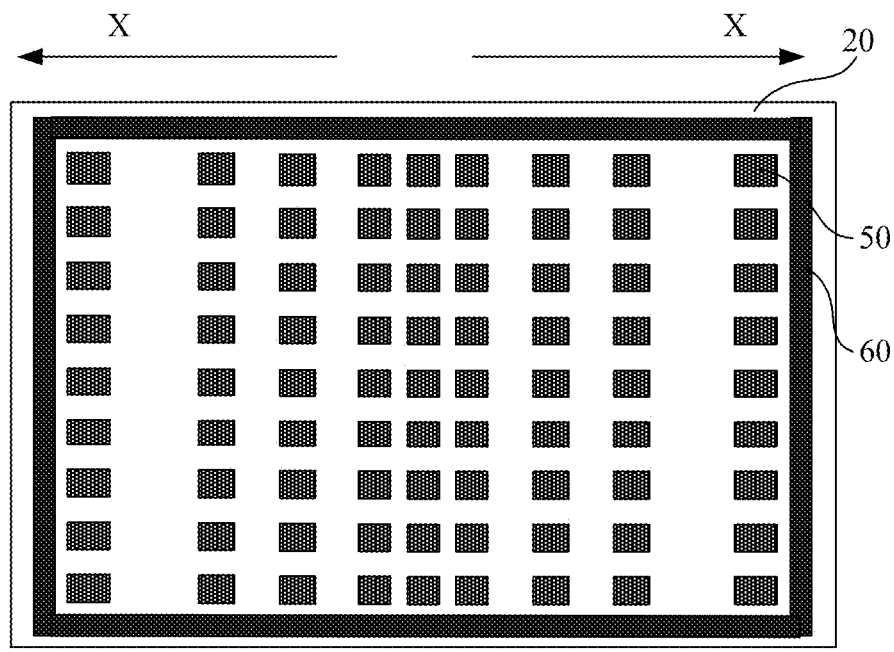
FIG. 5 is a second top view of FIG. 3 (without showing the first substrate, the spacer and the liquid crystal layer)

In an exemplary embodiment, as shown in FIG. 5, the black matrix frame 60 may also be disposed on each side of the outer periphery of the liquid crystal layer 30, and black matrix frames 60 at adjacent sides may be connected end to end.

Further, as shown in FIG. 5, a black matrix frame 60 may also be disposed on all four sides of the entire curved display panel, and black matrix frames 60 at adjacent sides may be connected end to end, such that the black matrix frames 60 on the entire curved display panel form a closed rectangular frame on the curved display panel. In this way, light leakage at each side and corner of the entire curved display panel can be blocked. It can further reduce the edge light leakage of the curved display panel, and improve the display effect.

According to another aspect of an embodiment of the present disclosure, there is provided a curved display device including the curved display panel any one of the above.

When the curved surface display device of the embodiment of the present disclosure is used for curved surface display, since the densities of the spacers 40 on the curved display panel are gradually reduced from the center of the curved display panel to either side of the non-curved edges, it can solve the problem that the compression ratio of the spacers 40 at the central position of the panel is larger than the compression ratio of the spacers 40 at the edge position of the panel during the bending process of the curved display panel. It can solve the problem of defective display such as yellowish partial displayed screen due to the inconsistency of forces on the curved display panel due to the bending operation. It can improve the display effect of the curved display device.

In the above detailed description of the structure and working principle of the curved display panel of the embodiment of the present disclosure, the curved display device including the curved display panel has been correspondingly described, which will not be described here.

Figure 6:
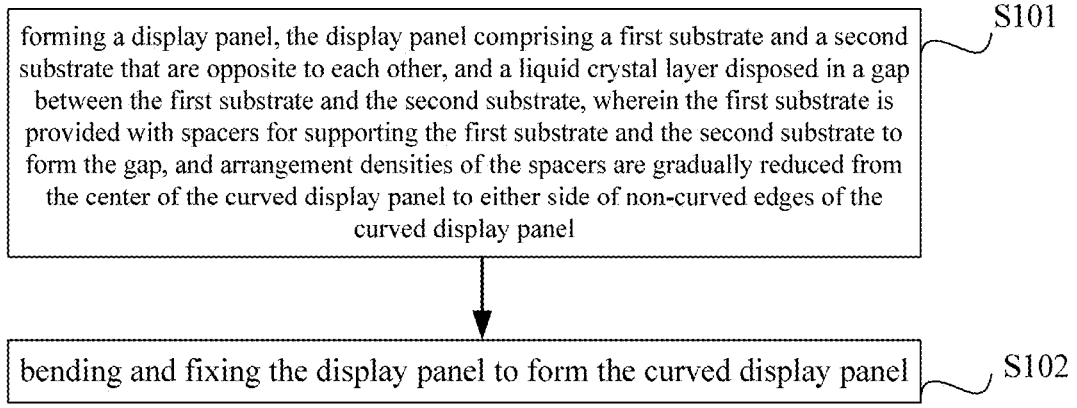
FIG. 6 is a first flowchart of a method for manufacturing a curved display panel according to an embodiment of the present disclosure.

In still another aspect of the embodiments of the present disclosure, a method for manufacturing a curved display panel is provided. As shown in FIG. 6, the method includes the following steps.

Figure 7:
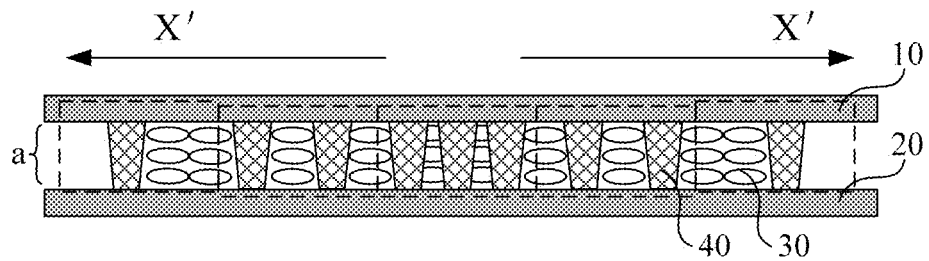
FIG. 7 is a schematic structural diagram of a flat display panel before a curved display panel is formed to a curved shape according to an embodiment of the present disclosure.

In step S101, a display panel is formed. As shown in FIG. 7, the display panel includes a first substrate 10 and a second substrate 20 that are opposite to each other, a liquid crystal layer 30 disposed in a gap a between the first substrate 10 and the second substrate 20. The first substrate 10 is provided with spacers 40 for supporting the first substrate 10 and the second substrate 20 to form the gap a. The arrangement densities of the spacers 40 are gradually reduced from the center of the curved display panel to either side of the non-curved edges.

In S102, the display panel is bent and fixed to form a curved display panel.

As shown in FIG. 7, firstly, a flat display panel is formed, including spacers 40 disposed on the first substrate 10, such that when the first substrate 10 and the second substrate 20 are aligned opposite to each other, the spacers 40 can support a gap a formed between the first substrate 10 and the second substrate 20. The densities of the spacers 40 are arranged in advance to gradually decrease from the center of the display panel to either side of the non-curved edge. As shown in FIG. 7, the arrangement densities of the spacers 40 gradually decrease in the bending direction X'.

Then, the display panel is bent in the bending direction X', and the first substrate 10 and the second substrate 20 composing the display panel undergo corresponding bending deformations. Since in the bending process, the compression amount of the spacers 40 at the central position along the bending direction X' of the display panel under the force is larger than the compression amount of the spacers 40 at position of either side of the non-curved edge. In this way, more spacers 40 at the central position share more compression amount at the central position. It can balance the compression ratios of the spacers at various positions on the curved display panel during the bending process. It can improve the uniformity of the pressure received by the liquid crystal molecules at various positions in the liquid crystal layer 30. When the display panel is bent to a desired curvature along the bending direction X', the display panel is fixed to form a curved surface display panel.

Figure 8:
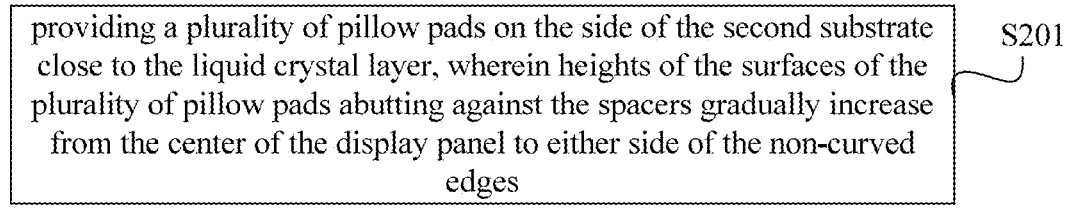
FIG. 8 is a second flowchart of a method for manufacturing a curved display panel according to an embodiment of the present disclosure.

In an exemplary embodiment, as shown in FIG. 8, forming a display panel includes the following steps.

Figures 9, 10:
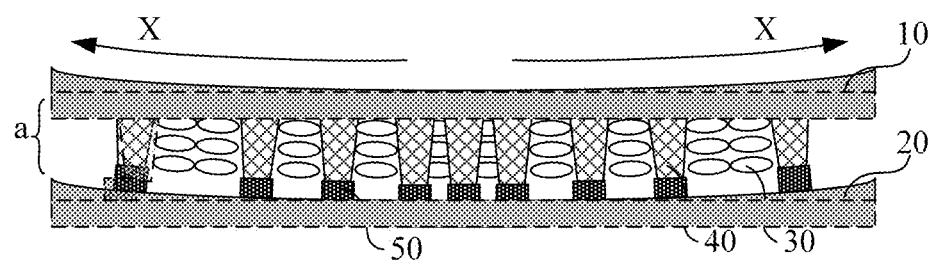
FIG. 9 is a schematic structural diagram of a corresponding relationship between a spacer and a pillow pad in a curved forming process of a curved display panel according to an embodiment of the present disclosure.
FIG. 10 is a third flowchart of a method for manufacturing a curved display panel according to an embodiment of the present disclosure.

In step S201, as shown in FIG. 9, a plurality of pillow pads 50 are distributed and arranged on the side of the second substrate 20 close to the liquid crystal layer 30. Heights of the surfaces of the plurality of pillow pads 50 abutting against the spacers 40 gradually increase from the center of the display panel to either side of the non-curved edges.

As shown in FIG. 9, a plurality of pillow pads 50 is disposed on the side of the second substrate 20 close to the liquid crystal layer 30. The number of the pillow pads 50 and the number of the spacers 40 disposed on the first substrate 10 are the same and the installation positions thereof correspond to each other. The heights of the surfaces of the plurality of pillow pads 50 abutting against the spacers 40 gradually increase along the bending direction X', and from the center to either side of the non-curved edges of the display panel.

It should be noted that, before the display panel performs a bending operation, the pillow pads 50 and the spacers 40 are arranged corresponding to each other. The orthogonal projections thereof do not overlap with each other. Instead, as shown in FIG. 9, the pillow pad 50 at the central position of the display panel in the bending direction X' correspond to the spacer 40, with orthogonal projections thereof overlap with each other. The more close to the position of either side of the non-curved edges of the display panel in the bending direction X', the more outward the position of the pillow pad 50 is shifted with respect to the corresponding spacer 40. As a result, in the bending operation of the display panel, as shown in FIG. 9, as the first substrate 10 and the second substrate 20 deform along the curved edges, the free ends of the spacers 40 provided on the first substrate 10 gradually shifted to either side of the non-curved edges. The more close to the position of either side of the non-curved edges, the more outward the free ends of the spacers 40 are shifted. With pillow pads 50 disposed corresponding to the spacers 40 in such manner, after the bending and deformation, free ends of each spacer 40 may slide into the corresponding pillow pad 50. Further with the disposed heights of the pillow pads 50, It can further balance the compression ratios of the spacers 40 at various positions on the curved display panel during the bending process. It can improve the uniformity of the pressure received by the liquid crystal molecules at various positions in the liquid crystal layer 30.

Further, as shown in FIG. 10, forming the display panel includes the following steps.

In step S301, between the first substrate 10 and the second substrate 20, a black matrix frame 60 is disposed at the outer periphery of the liquid crystal layer 30, at least along the two sides of the non-curved edges of the display panel.

In this way, as shown in FIG. 4, with the black matrix frame 60 disposed along the two sides of the non-curved edges of the display panel, it can effectively reduce light leakage in the dark state at edges for the curved display panel formed, caused by the disordered optical path difference of liquid crystal molecules, which is in turn caused by the pressing effect to the liquid crystal molecules of the liquid crystal layer 30 close to either side of the non-curved edges by the bending and deforming of the first substrate 10 and the second substrate 20 after the bending operation of the display panel along the bending direction X'. It can improve the display effect of the curved display panel.

In the above detailed description of the structure and working principle of the curved display panel of the embodiment of the present disclosure, the method steps for forming the above curved display panel have been described in detail, which will not be repeated here.

The foregoing descriptions are merely specific implementation manners of the present disclosure, but the protection scope of the present disclosure is not limited thereto. Modification or replacement within the technical scope disclosed by the present disclosure readily devised by those skilled in the art should be within the scope of the disclosure. Therefore, the protection scope of the present disclosure should be based on the protection scope of the claims.

What is claimed is:

1. A curved display panel comprising:
 a first substrate and a second substrate opposite to each other;
 a liquid crystal layer disposed in a gap between the first substrate and the second substrate; and
 wherein the first substrate is provided with spacers for supporting the first substrate and the second substrate to form the gap, and
 densities of the spacers are gradually reduced from the center of the curved display panel to either side of non-curved edges of the curved display panel; and
 from the center a plurality of pillow pads distributed on the side of the second substrate close to the liquid crystal layer, with one end of the spacer close to the second substrate abutting against the pillow pad, wherein of the curved display panel to either side of the non-curved edges, heights of the surfaces of the plurality of pillow pads abutting against the spacers gradually increase.

2. The curved display panel according to claim 1, wherein a ratio of the densities of providing the spacers at a central position of the curved display panel to densities of providing the spacers at either side of the non-curved edges of the curved display panel is greater than 1 and equal to or less than 3.

3. The curved display panel according to claim 2, wherein between the first substrate and the second substrate, a black matrix frame is disposed on an outer periphery of the liquid crystal layer, at least along the two sides of the non-curved edges of the curved display panel.

4. The curved display panel according to claim 3, wherein the black matrix frame is disposed on each side of the outer periphery of the liquid crystal layer, and black matrix frames at adjacent sides are connected end to end.

5. The curved display panel according to claim 1, wherein the pillow pad is disposed corresponding to the spacer, the pillow pad is a disc shape structure depressed in the center, and the surface abutting against the spacer is the center of the disc shape structure.

6. The curved display panel according to claim 5, wherein between the first substrate and the second substrate, a black matrix frame is disposed on an outer periphery of the liquid crystal layer, at least along the two sides of the non-curved edges of the curved display panel.

7. The curved display panel according to claim 1, wherein the pillow pad is a metal pillow pad.

8. The curved display panel according to claim 7, wherein between the first substrate and the second substrate, a black matrix frame is disposed on an outer periphery of the liquid crystal layer, at least along the two sides of the non-curved edges of the curved display panel.

9. The curved display panel according to claim 1, wherein between the first substrate and the second substrate, a black matrix frame is disposed on an outer periphery of the liquid crystal layer, at least along the two sides of the non-curved edges of the curved display panel.

10. The curved display panel according to claim 9, wherein the black matrix frame is disposed on each side of the outer periphery of the liquid crystal layer, and black matrix frames at adjacent sides are connected end to end.

11. A curved display device comprising the curved display panel according to claim 1.

12. The curved display device according to claim 11, wherein a ratio of the densities of providing the spacers at a central position of the curved display panel to the densities of providing the spacers at either side of the non-curved edges of the curved display panel is greater than 1 and equal to or less than 3.

13. The curved display device according to claim 11, wherein the pillow pad is disposed corresponding to the spacer, the pillow pad is a disc shape structure depressed in the center, and the surface abutting against the spacer is the center of the disc shape structure.

14. A method for manufacturing a curved display panel, comprising:
    forming a display panel, the display panel comprising a first substrate and a second substrate that are opposite to each other, and a liquid crystal layer disposed in a gap between the first substrate and the second substrate, wherein the first substrate is provided with spacers for supporting the first substrate and the second substrate to form the gap, and densities of the spacers are gradually reduced from the center of the curved display panel to either side of non-curved edges of the curved display panel;
    providing a plurality of pillow pads on the side of the second substrate close to the liquid crystal layer, wherein heights of the surfaces of the plurality of pillow pads abutting against the spacers gradually increase from the center of the display panel to either side of the non-curved edges;
    bending and fixing the display panel to form the curved display panel.

15. The method for manufacturing a curved display panel according to claim 14, wherein the step of forming the display panel comprises:
    between the first substrate and the second substrate, providing a black matrix frame at the outer periphery of the liquid crystal layer, at least along the two sides of the non-curved edges of the display panel.

* * * * *